(12) United States Patent
Sano et al.

(10) Patent No.: US 9,981,447 B2
(45) Date of Patent: May 29, 2018

(54) FIBER-REINFORCED RESIN JOINED BODY HAVING CAULKED PART AND MANUFACTURING METHOD THEREOF

(71) Applicant: Teijin Limited, Osaka-shi, Osaka (JP)

(72) Inventors: Hiroki Sano, Osaka (JP); Takumi Kato, Osaka (JP); Takeru Ohki, Osaka (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days. days.

(21) Appl. No.: 14/892,946

(22) PCT Filed: Mar. 20, 2015

(86) PCT No.: PCT/JP2015/058533
§ 371 (c)(1),
(2) Date: Nov. 20, 2015

(87) PCT Pub. No.: WO2015/146846
PCT Pub. Date: Oct. 1, 2015

(65) Prior Publication Data
US 2016/0096340 A1    Apr. 7, 2016

(30) Foreign Application Priority Data
Mar. 25, 2014  (JP) ................... 2014-061711

(51) Int. Cl.
*B32B 3/24* (2006.01)
*B32B 3/26* (2006.01)
(Continued)

(52) U.S. Cl.
CPC ............ *B32B 3/266* (2013.01); *B29C 65/606* (2013.01); *B29C 66/1122* (2013.01);
(Continued)

(58) Field of Classification Search
CPC ................... B32B 3/266; B29C 65/606; Y10T 428/24339; Y10T 428/24347
(Continued)

(56) References Cited

U.S. PATENT DOCUMENTS 4,291,076 A * 9/1981 Katoh ................... B60R 13/07
293/126
5,053,263 A * 10/1991 Krone ................... B29C 70/08
428/120
(Continued)

FOREIGN PATENT DOCUMENTS

FR         2978510        2/2013
JP     54-156763 A      12/1979
(Continued)

OTHER PUBLICATIONS

Jun. 2, 2015—International Search Report—Intl App PCT/JP2015/058533.
(Continued)

Primary Examiner — William P Watkins, III
(74) Attorney, Agent, or Firm — Banner & Witcoff, Ltd.

(57) ABSTRACT

There is provided a fiber-reinforced resin joined body, including: a fiber-reinforced resin shaped product A containing reinforcing fibers and a thermoplastic resin, and including at least one a protrusion part with a buckling strength of 80 MPa to 450 MPa; and a member B including at least one through hole, wherein the protrusion part of the fiber-reinforced resin shaped product A is inserted into the through hole of the member B, and a caulked part is provided in a portion of the protrusion part, protruding from the through hole.

13 Claims, 1 Drawing Sheet

(51) Int. Cl.
*B29C 65/60* (2006.01)
*B29C 65/00* (2006.01)
*B29L 31/30* (2006.01)
*F16B 17/00* (2006.01)

(52) U.S. Cl.
CPC ............ *B29C 66/41* (2013.01); *B29C 66/721* (2013.01); *B29C 66/739* (2013.01); *B29C 66/7315* (2013.01); *B29C 66/7392* (2013.01); *B29C 66/71* (2013.01); *B29C 66/742* (2013.01); *B29L 2031/3002* (2013.01); *B32B 2260/021* (2013.01); *B32B 2260/046* (2013.01); *B32B 2605/00* (2013.01); *F16B 17/008* (2013.01); *Y10T 428/24339* (2015.01); *Y10T 428/24347* (2015.01)

(58) Field of Classification Search
USPC .......................................... 403/280; 411/501
See application file for complete search history.

(56) References Cited

U.S. PATENT DOCUMENTS

| | | | |
|---|---|---|---|
| 5,086,997 A | 2/1992 | Glass | |
| 5,354,160 A * | 10/1994 | Pratt | B21J 15/00 29/243.521 |
| 7,351,022 B2 * | 4/2008 | Denslow | F16B 5/04 411/501 |
| 2001/0005541 A1 * | 6/2001 | Iida | B29C 65/08 428/139 |
| 2007/0158011 A1 | 7/2007 | Tominaga et al. | |
| 2009/0024161 A1 * | 1/2009 | Bonutti | A61B 17/0401 606/213 |
| 2012/0025020 A1 * | 2/2012 | Plithides | C08G 61/10 244/129.1 |

FOREIGN PATENT DOCUMENTS

| | | |
|---|---|---|
| JP | H01-049615 B2 | 10/1989 |
| JP | H10-140733 A | 5/1998 |
| JP | 2000-127248 A | 5/2000 |
| JP | 2003-290577 A | 10/2003 |
| JP | 4265987 B2 | 5/2009 |

OTHER PUBLICATIONS

Jun. 2, 2015—Written Opinion of ISA—Intl App PCT/JP2015/058533.
Mar. 30, 2017—(EP) Office Action—App 15769550.3.
Mar. 16, 2017—(EP) Supplementary Search Report—App 15769550.
Bruckner, Eric, et al.: "Materials and processes influences during the riveting of technical plastics," Joining Plastics—Fugen Von Kunststoffen, vol. 7, No. 2, Feb. 1, 2013, pp. 98-103.

* cited by examiner

FIBER-REINFORCED RESIN JOINED BODY HAVING CAULKED PART AND MANUFACTURING METHOD THEREOF

CROSS REFERENCE TO RELATED APPLICATIONS

This is a U.S. National Phase Application under 35 U.S.C. § 371 of International Application No. PCT/JP2015/058533, filed Mar. 20, 2015, which claims priority to Japanese Application 2014-061711 filed Mar. 25, 2014, and which was published Under PCT Article 21(2), the entire contents of which are incorporated herein by reference.

TECHNICAL FIELD

The present invention relates to a fiber-reinforced resin joined body, and a manufacturing method thereof. More specifically, the present invention relates to a fiber-reinforced resin joined body including a caulked part and having a satisfactory joining strength, and is suitably applicable for structural components represented by a vehicle.

BACKGROUND ART

In recent years, a so-called fiber-reinforced resin material containing a matrix resin and reinforcing fibers such as carbon fibers has been attracted in the mechanical field. In joining of fiber-reinforced resin materials, which is required in manufacturing of components or structural bodies, a method of enhancing rigidity by forming a closed section has been suggested. When fiber-reinforced resin materials containing a thermoplastic resin as the matrix are joined, a mechanical fastening using bolts and nuts, rivet or the like, a chemical joining using an adhesive, and a thermal joining using an ultrasonic welding, a vibration welding, and the like have been suggested. Among them, caulking is a method of joining by deforming a tip end of a protrusion substance by heat, and a high joining strength in a peel direction may be obtained. Also, for the reason that various heating methods using heat or ultrasonic may be applicable when caulking, the caulking has been widely used in various industrial fields (see Patent Document 1).

When a caulking shape is broken in a peel direction, any of a base material breakage in which the base material is broken, a shaft part breakage in which the shaft is broken, a neck part breakage in which a base of umbrella part is broken, and an umbrella part breakage in which the inside of the umbrella part is broken parallel to the shaft occurs. When general resins are caulked, the shaft part breakage, the neck part breakage or the umbrella part breakage occurs depending on condition for caulking. Among them, the shaft part breakage and the neck part breakage are largely affected by a cross section of the shaft, i.e., shaft diameter. However, these are basically dependent on tensile modulus of a resin, and therefore the caulked part does not necessarily have a high joining strength. Conversely, it is necessary to make the shaft diameter thick in order to obtain a high joining strength, and it becomes a factor of limitation in design.

On the other hand, when the fiber-reinforced resin materials are caulked, since the fiber-reinforced resin material has excellent tensile strength than the general resins, the base material breakage or the umbrella part breakage occurs in many cases depending on caulking conditions. The base material breakage depends on strength or thickness of the base material. The umbrella part breakage is a breakage occurred by shear force at the inside of the umbrella part, the shear force applied in a parallel direction to the shaft, and it is important in design to impart excellent shear strength.

CITATION LIST

Patent Document

Patent Document 1: Japanese Patent No. 4,265,987

SUMMARY OF INVENTION

Problems to be Solved by Invention

An objective of the present invention is to provide a novel fiber-reinforced resin joined body with excellent joining strength, in particular, to provide a fiber-reinforced resin joined body with excellent joining strength in a vertical direction (peel direction) to a surface (joining surface) on which two members are joined.

Also, another objective of the present invention is to provide a manufacturing method of the fiber-reinforced resin joined body, in which the fiber-reinforced resin joined body is effectively manufactured at a short time due to small energy loss in joining

Means for Solving the Problems

The present inventors have intensively studied for obtaining a fiber-reinforced resin joined body with excellent joining strength. As a result, they have found that by controlling a buckling strength of a protrusion part to be used for caulking, an objective fiber-reinforced resin joining body may be obtained, and the present invention has been completed.

That is, the present invention is as follows.

[1] A fiber-reinforced resin joined body, comprising: a fiber-reinforced resin shaped product A containing reinforcing fibers and a thermoplastic resin, and including at least one a protrusion part with a buckling stress of 80 MPa to 450 MPa; and a member B including at least one through hole, wherein the protrusion part of the fiber-reinforced resin shaped product A is penetrated into the through hole of the member B, and a caulked part is provided in a portion of the protrusion part, protruding from the through hole.

[2] The fiber-reinforced resin joined body according to [1], wherein a tensile modulus of the fiber-reinforced resin shaped product A is 15 GPa to 35 GPa.

[3] The fiber-reinforced resin joined body according to [1] or [2], wherein at least one reinforcing fiber in the reinforcing fibers is contained in the protrusion part and a portion of the fiber-reinforced resin shaped product A other than the protrusion part.

[4] The fiber-reinforced resin joined body according to any one of [1] to [3], wherein the caulked part includes an undeformed part at an inside, a length L1 of the undeformed part and a height L2 of the caulked part satisfy the following formula:

$$0 < L1/L2 < 0.6.$$

[5] The fiber-reinforced resin joined body according to any one of [1] to [4], wherein the member B is a member of at least one selected from the group consisting of a metal, a resin and a resin containing reinforcing fibers.

[6] The fiber-reinforced resin joined body according to [5], wherein the resin containing reinforcing fibers in the member B is a thermoplastic resin.

[7] The fiber-reinforced resin joined body according to [6], wherein the thermoplastic resin in the member B is the same type of resin as the thermoplastic resin in the fiber-reinforced resin shaped product A.

[8] The fiber-reinforced resin joined body according to any one of [1] to [7], wherein the caulked part is in contact with a surface of the member B.

[9] The fiber-reinforced resin joined body according to any one of [1] to [8], wherein the reinforcing fibers contained in the fiber-reinforced resin shaped product A are discontinuous fibers.

[10] A manufacturing method for a fiber-reinforced resin joined body, comprising: inserting a protrusion part of a fiber-reinforced resin shaped product A containing reinforcing fibers and a thermoplastic resin and including at least one protrusion part with a buckling stress of 80 MPa to 450 MPa into a through hole of a member B including at least one through hole to protrude a tip end part of the protrusion part from the through hole; and caulking the tip end part.

[11] The manufacturing method for a fiber-reinforced resin joined body according to [10], wherein the caulking includes pressing the tip end part while heating.

[12] The manufacturing method for a fiber-reinforced resin joined body according to [11], wherein the heating is a heating by using infrared ray or ultrasonic.

[13] The manufacturing method for a fiber-reinforced resin joined body according to any one of [10] to [12], wherein a length (L1) of the undeformed part and a height (L2) of the caulked part satisfy the following formula:

$$0 < L1/L2 < 0.6.$$

Advantageous Effects of Invention

A fiber-reinforced resin joined body of the present invention has excellent joining strength in a peel direction even when a joining time is short, and for example, it is suitably applicable for structural members of vehicles such as an automobile, and such structural members may be manufactured effectively.

Further, according to the present invention, energy loss in joining is small, and therefore, a fiber-reinforced resin joined body may be effectively manufactured at a short time.

DESCRIPTION OF EMBODIMENTS

A fiber-reinforced resin joined body of the present invention, including: a fiber-reinforced resin shaped product A containing reinforcing fibers and a thermoplastic resin, and including at least one a protrusion part with a buckling stress of 80 MPa to 450 MPa; and a member B including at least one through hole, wherein the protrusion part of the fiber-reinforced resin shaped product A is penetrated into the through hole of the member B, and a caulked part is provided in a portion of the protrusion part, protruding from the through hole.

The fiber-reinforced resin shaped product is a shaped product containing the reinforcing fibers in the matrix constituted by the thermoplastic resin. Detailed explanation thereof will be described later.

Types of the member B are not particularly limited so long as the member B has at least one through hole, and for examples, a metal, a resin and a ceramic are exemplified. Examples of the metal include iron, aluminum, copper, titanium and alloys thereof. Examples of the resin include a synthetic resin a non synthetic resin (natural material polymer), and as the synthetic resin, a thermoplastic resin and a thermosetting resin may be used. Examples of the thermoplastic resin include: general plastics such as a polyethylene, a polyvinyl chloride, a polystyrene, an ABS and an acrylic resin; engineering plastics such as a polyamide, a polycarbonate, a polyphenylene ether, a polyester (PET, PBT and the like) and a cyclic polyolefin (COP); and super engineering plastics such as a polyphenylene sulfide (PPS), a polyether ketone (PEK), a polyether ether ketone (PEEK),a polytetrafluoroethylene, a thermoplastic polyimide, a polyarylate, a polysulfone, a polyether sulfone (PES), a liquid crystalline polymer (LCP) and a polyamide imide. Examples of the thermosetting resin include: an epoxy resin, a phenol resin, an unsaturated polyester resin, a melamine resin, an urea resin, a curable polyimide resin.

The above resin may contain, as a reinforcing fiber, inorganic fibers such as glass fibers and carbon fibers and organic fibers such as aramid fibers, polyester fibers and polyamide fibers.

The member B is preferably a member of at least one selected from the group consisting of a metal, a resin and a resin containing reinforcing fibers. From the viewpoint of balance of mechanical properties and light weight, similarly to the fiber-reinforced resin shaped product A, the member B is preferably a fiber-reinforced resin shaped product containing reinforcing fibers and a thermoplastic resin as a matrix, and it is more preferable that the thermoplastic resin in the member B is the same type of resin as the thermoplastic resin in the fiber-reinforced resin shaped product A. Hereinafter, as an example of the member B, a fiber-reinforced resin shaped product B containing reinforcing fibers and a thermoplastic resin as a matrix will be explained.

(Fiber-Reinforced Resin Shaped Products A and B)

The fiber-reinforced resin shaped products A and B used in the present invention contain reinforcing fibers and a thermoplastic resin. Specifically, the thermoplastic resin is a matrix, and the reinforcing fibers are contained in the matrix. The reinforcing fibers contained in the fiber-reinforced resin shaped product A may be same as or different from those contained in the fiber-reinforced resin shaped product B, depending on the purpose. From the viewpoint of productivity, use of the same type of the reinforcing fibers is preferable in many cases. The thermoplastic resin contained in the fiber-reinforced resin shaped product A may be same as or different from that contained in the fiber-reinforced resin shaped product B, depending on the purpose. From the viewpoint of productivity, use of the same type of the reinforcing fibers is preferable in many cases.

The content of the matrix in the fiber-reinforced resin shaped products A and B may be suitably determined depending on type of the matrix or type of the reinforcing fibers which are described later, and the like, and is not particularly limited. The content is generally within a range of 3 parts by mass to 1000 parts by mass, more preferably 30 parts by mass to 200 parts by mass and further preferably 30 parts by mass to 150 parts by mass, with respect to the 100 parts by mass of the reinforcing fibers. In the case where the content of the matrix is less than 3 parts by mass with respect to the 100 parts by mass of the reinforcing fibers, dry reinforcing fibers in a dry state in which impregnation in manufacturing processes described later is insufficient are increased in some case. Also, in the case where the content of the matrix exceeds to 1000 parts by mass, an amount of the reinforcing fibers is too small and an obtained member is inappropriate for a structural material in many cases. The ratios of the matrix and the reinforcing fibers in the fiber-reinforced resin shaped products A and B, respectively, may be the same or different depending on the application.

The fiber-reinforced resin shaped product A may be a flat plate, a prism, a polyhedron or the like, which has a flat part and has a cross section thereof being in a shape of polygon such as quadrangle. The fiber-reinforced resin shaped product preferably include a protrusion part in a vertical direction to the flat part on the flat part, the protrusion part having a buckling stress of 80 MPa to 450 MPa. A thickness of the flat part may be uniform or be varied, but from the viewpoint of mechanical strength, the thickness is preferably uniform. The thickness of the flat part is preferably within a range of 1 mm to 20 mm. In the case where the fiber-reinforced resin shaped product A is a flat plate, a thickness of the flat plate may be uniform or be varied within a range of 1 mm to 20 mm.

The fiber-reinforced resin shaped product B may be a flat plate, a prism, a polyhedron or the like, which has a flat part and has a cross section being in a shape of polygon such as quadrangle. The fiber-reinforced resin shaped product B preferably includes at least one through hole in a vertical direction to the flat part on the flat part. The thickness around the through hole of the fiber-reinforced resin shaped product B is preferably within a range of 1 mm to 20 mm. In the case where the fiber-reinforced resin shaped product B is a flat plate, a thickness of the flat plate may be uniform or be varied within a range of 1 mm to 20 mm.

(Reinforcing Fibers)

The type of the reinforcing fiber used in the present invention may be suitably selected according to the type of the matrix, the use of the fiber-reinforced resin joined body of the present invention, and the like, and is not particularly limited. For this reason, as a reinforcing fiber used in the present invention, both inorganic fibers and organic fibers may be preferably used.

As the inorganic fiber, for example, carbon fibers, activated carbon fibers, graphite fibers, glass fibers, tungsten carbide fibers, silicon carbide fibers, ceramic fibers, alumina fibers, natural fibers, mineral fibers such as basalt, boron fibers, boron nitride fibers, boron carbide fibers, metal fibers, and the like may be included.

As the metal fiber, for example, aluminum fibers, copper fibers, brass fibers, stainless steel fibers, steel fibers, and the like may be included.

As the glass fiber, glass fibers formed of E glass, C glass, S glass, D glass, T glass, quartz glass fibers, borosilicate glass fibers, or the like may be included.

As the organic fiber, for example, fiber formed of a resin material such as aramid, polyparaphenylene bezoxazole (PBO), polyphenylene sulfide, polyester, acryl, polyamide, polyolefin, polyvinyl alcohol, polyarylate, or the like may be included.

In the present invention, two or more types of reinforcing fibers may be used in combination. In this case, a plurality of types of the inorganic fiber may be used in combination, a plurality of types of the organic fiber may be used in combination, or the inorganic fiber and the organic fiber may be used in combination.

As an embodiment of using the plurality of types of the inorganic fiber in combination, for example, an embodiment of using a carbon fiber and a metal fiber in combination, an embodiment of using a carbon fiber and a glass fiber in combination, and the like may be included. On the other hand, as an embodiment of using the plurality of types of the organic fiber in combination, for example, an embodiment of using aramid fibers and fibers formed of other organic materials in combination, and the like may be included. Further, as an embodiment of using the inorganic fiber and the organic fiber in combination, for example, an embodiment of using carbon fibers and aramid fibers in combination may be included.

In the present invention, it is preferable that carbon fibers are used as a reinforcing fiber. This is because the carbon fiber is able to obtain the fiber-reinforced resin joined body of the present invention having light weight and excellent strength.

As the carbon fiber, in general, polyacrylonitrile (PAN)-based carbon fibers, petroleum oil and coal pitch-based carbon fibers, rayon-based carbon fibers, cellulose-based carbon fibers, lignin-based carbon fibers, phenol-based carbon fibers, vapor phase growth-based carbon fibers, and the like are known, and in the present invention, any carbon fibers may be preferably used.

Among them, in the present invention, it is preferable that the polyacrylonitrile (PAN)-based carbon fibers are used from a viewpoint of excellent tensile strength. When the PAN-based carbon fibers are used as a reinforcing fiber, the tensile modulus thereof is preferably in a range of 100 GPa to 600 GPa, is more preferably in a range of 200 GPa to 500 GPa, and is even more preferably in a range of 230 GPa to 450 GPa. In addition, the tensile strength is preferably in a range of 2000 MPa to 10000 MPa, and is more preferably in a range of 3000 MPa to 8000 MPa.

The reinforcing fiber used in the present invention may be a reinforcing fiber in which a sizing agent is adhered to the surface. When the reinforcing fiber to which the sizing agent is adhered is used, the type of the sizing agent may be suitably selected according to the type of the reinforcing fiber and the matrix, and is not particularly limited.

The form of the reinforcing fiber used in the present invention is not particularly limited, and for example, may be a woven fabric, a knitted fabric, a unidirectional material, a continuous fiber, a discontinuous fiber having a specific length, or a combination thereof. In the present invention, when molding the fiber-reinforced resin shaped product A including the protrusion part, it is preferable that reinforcing fibers in a form in which the reinforcing fiber is easily contained in the protrusion part by once molding are used. The forms of the reinforcing fibers contained in the fiber-reinforced resin shaped products A and B, respectively, may be the same or different.

The fiber length of the reinforcing fiber used in the present invention may be suitably determined according to the type of the reinforcing fiber or the type of the matrix, an orientation state of the reinforcing fibers in the fiber-reinforced resin shaped products A and B, respectively, and is not particularly limited. Therefore, in the present invention, a continuous fiber may be used or a discontinuous fiber may be used according to the purpose. Also, the continuous fiber and the discontinuous fiber may be used in combination. In the case of using the discontinuous fiber, an average fiber length is preferably within a range of 0.1 mm to 500 mm, and particularly preferably within a range of 1 mm to 100 mm. The average fiber length of the reinforcing fibers contained in the fiber-reinforced resin shaped products A and B, respectively, may be the same or different.

The manufacturing method of the fiber-reinforced resin shaped product A will be described later. In the present invention, for example, an injection molding and a compression molding (press molding) are preferable. In the case of the injection molding, a length of reinforcing fibers contained in a molding material (preferably, in a pellet-form) is preferably within a range of 0.1 mm to 10 mm. In the case of the compression molding, as a reinforcing fiber contained in a molding material (preferably, sheet material), discontinuous fibers having a length of 1 mm to 100 mm, and continuous fibers such as a woven fabric, a knitted fabric, and a unidirectional material may be exemplified. The sheet material may be one or may be used by stacking a plurality of sheets.

In the present invention, reinforcing fibers having different fiber length from each other may be used in combination. In other words, the reinforcing fibers used in the present invention may be a single peak or a plurality of peaks in fiber length distribution.

An average fiber length of the reinforcing fibers may be determined by, for example, measuring fiber lengths of 100 fibers randomly extracted from the fiber-reinforced resin shaped products A and B with a vernier caliper down to 1 mm unit, and performing calculation based on the following expression. The extraction of the reinforcing fibers from the fiber-reinforced resin shaped products A and B may be performed by subjecting the fiber-reinforced resin shaped products A and B to heating treatment at around 500° C. for around 1 hour to remove the resin in a furnace.

Number Average Fiber Length: $Ln=\Sigma Li/j$
(Li: Fiber length of single yarn of reinforcing fibers, j: Number of reinforcing fibers)

Weight Average Fiber Length: $(\Sigma Li^2)/(\Sigma Li)$

Here, in a case where cutting is carried out with a rotary cutter, or the like, when a fiber length is a constant, the number average fiber length and the weight average fiber length are the same value.

In the present invention, the number average fiber length and the weight average fiber length may be adopted, but the weight average molecular weight is able to more precisely show physical property of a fiber-reinforced resin material in many cases.

The fiber diameter of the reinforcing fiber used in the present invention may be suitably determined according to the type of the reinforcing fiber, and is not particularly limited.

For example, when carbon fibers are used as a reinforcing fiber, in general, the average fiber diameter is preferably in a range of 3 µm to 50 µm, is more preferably in a range of 4 µm to 12 µm, and is even more preferably in a range of 5 µm to 8 µm.

On the other hand, when glass fibers are used as a reinforcing fiber, in general, the average fiber diameter is preferably in a range of 3 µm to 30 µm.

Here, the average fiber diameter described above indicates the diameter of a single yarn of the reinforcing fibers. Therefore, when the reinforcing fibers are in a fiber bundle form, the average fiber diameter described above does not indicate the diameter of the fiber bundle but the diameter of the reinforcing fiber (single yarn) constituting the fiber bundle. The average fiber diameter of the reinforcing fiber may be measured by, for example, a method disclosed in JIS R7607:2000.

The reinforcing fibers used in the present invention may be either in a single yarn form constituted by a single yarn or in a fiber bundle form constituted by a plurality of single yarns, regardless of the kind thereof.

The reinforcing fibers used in an embodiment of the present invention may include fibers in a single yarn form only, fibers in a fiber bundle form only, or fibers in both forms. The fiber bundle shown herein indicates that two or more single yarns come close to each other by a sizing agent, an electrostatic force, or the like. When the fiber bundle is used, the number of single yarns constituting each fiber bundle may be almost the same or may be different in each fiber bundle.

When the reinforcing fibers used in an embodiment of the present invention are in a fiber bundle form, the number of single yarns constituting each fiber bundle is not particularly limited. However, it is usually within a range of 10 to 100,000.

In general, the carbon fibers are in the fiber bundle form in which several thousands to several tens of thousands of filaments are collected together. In the case where the carbon fibers are used as a reinforcing fiber, when the carbon fibers are used as they are, entangled parts of the fiber bundle become locally thick, which sometimes makes it difficult to obtain thin-walled fiber-reinforced resin shaped products A and B. For this reason, when the carbon fibers are used as a reinforcing fiber, the fiber bundle is preferably widened or opened, and used. The widening degree or opening degree of the reinforcing fibers contained in the fiber-reinforced resin shaped products A and B in the present invention may be the same or different.

In the case of using opened carbon fiber bundles as a reinforcing fiber, the opening degree of the fiber bundles after opening is not particularly limited. It is preferable that by controlling the opening degree of the fiber bundles, a carbon fiber bundle including carbon fibers of the specific number or more, and a carbon fiber (single yarn) and/or a carbon fiber bundle including carbon fibers of less than the specific number, are contained. In this case, specifically, the carbon fibers preferably includes a carbon fiber bundle (A) constituted by carbon fibers of the critical number of single yarn or more, the critical number defined by the following formula (1), and opened carbon fibers other than the carbon fiber bundle (A), i.e., single yarn form or a carbon fiber bundle constituted by carbon fibers of less than the critical number.

$$\text{Critical Number of Single Yarns}=600/D \qquad (1)$$

(Here, D represents an average fiber diameter (µm) of carbon single yarn.)

Specifically, in the case where carbon fibers constituting the fiber-reinforced resin shaped product A or B, or the both thereof have an average fiber diameter of 5 µm to 7 µm, the critical number of single yarn defined by formula (1) is 86 to 120.

The carbon fiber bundles constituted by carbon fibers of more than the critical number of single yarn may be a suitable reinforcing material being excellent in handling property due to excellent shape-keeping properties and in flowability when molding. On contrary, the carbon fiber bundles constituted by carbon fibers of less than the critical number of single yarn may be in a cotton-like form in many cases due to low self-supporting properties. For this, handling property or flowability when molding tends to be lowered.

In the present invention, a ratio of the carbon fiber bundle (A) to the total amount of the carbon fibers in the fiber-reinforced resin shaped product A or B, or the both thereof, is preferably more than 0 Vol % and less than 99 Vol %, more preferably 20 Vol % or more and less than 99 Vol %, further preferably 30 Vol % or more and less than 95 Vol %, and most preferably 50 Vol % or more and less than 90 Vol %. This is because, by co-existing the carbon fiber bundles including carbon fibers of the specific number or more with other opened carbon fibers or carbon fiber bundles in a specific ratio, a content of carbon fibers in the fiber-reinforced resin shaped product A or B, or the both thereof, i.e., fiber volume content ratio (Vf) may be enhanced.

The opening degree of the carbon fibers may be controlled by adjusting opening condition of fiber bundles to be within an objective range. For example, in the case where air is blown to fiber bundles to open the fiber bundles, the opening degree may be controlled by adjusting a pressure of the air to be blown to the fiber bundles or the like. In this case, by increasing the pressure of the air, the opening degree tends to be high, i.e., the number of single yarns constituting each fiber bundle becomes small. By decreasing the pressure of the air, the opening degree tends to be low, i.e., the number of single yarns constituting each fiber bundle becomes large.

When carbon fibers are used as a reinforcing fiber in the present invention, an average fiber number (N) in the carbon fiber bundle (A) may be appropriately determined so long as an objective of the present invention is not impaired, and is not particularly limited.

In the case of the carbon fibers, N preferably satisfies 1<N<12000, and more preferably satisfies the following formula (2).

$$0.6 \times 10^4/D^2 < N < 1.0 \times 10^5/D^2$$

Here, D represents an average fiber diameter (μm) of carbon single yarn.

In the case where the average fiber diameter of the carbon fibers is 5 μm, the average number of fibers in the carbon fiber bundle (A) falls within the range of 240 to less than 4000. Among them, a range of 300 to 2500 is preferable, and a range of 400 to 1600 is more preferable. Also, in the case where the average fiber diameter of the carbon fibers is 7 μm, the average number of fibers in the carbon fiber bundle (A) falls within the range of 122 to 2040. Among them, a range of 150 to 1500 is preferable and a range of 200 to 800 is more preferable.

In the case where the average fiber number (N) in the carbon fiber bundle (A) is $0.6 \times 10^4/D^2$ or less, it becomes difficult to obtain one having a high reinforcing fiber volume content ratio (VD and to obtain a fiber-reinforced resin shaped product having excellent strength. Also, in the case where the average fiber number (N) in the carbon fiber bundle (A) is $1.0 \times 10^5/D^2$ or more, a thick part is locally formed to tend to cause voids. The fiber-reinforced resin shaped product satisfying the above requirement has an advantage that a fiber-reinforced resin shaped product including a convex part on the surface thereof may be easily obtained. Meanwhile, the critical number of single yarn of the reinforcing fibers contained in the fiber-reinforced resin shaped product A or B, or the both thereof, or the average fiber number (N) of the carbon fiber bundle (A), may be the same or different.

As a form of the carbon fiber bundle (A), a ratio of carbon fiber bundles with a thickness of 100 μm or more in the fiber-reinforced resin shaped product to the number of the total carbon fiber bundle (A) is preferably less than 3%. When the ratio of the carbon fiber bundles with a thickness of 100 μm or more is less than 3%, the thermoplastic resin is easily impregnated into the inside of the fiber bundles, which is preferable. The ratio of the carbon fiber bundles with a thickness of 100 μm or more is more preferably less than 1%. In order for the ratio of the carbon fiber bundles with a thickness of 100 μm or more to be less than 3%, a method where fibers to be used are widely opened and the widely opened fiber bundles are used, or the like may be adopted for the control.

(Matrix)

As representative matrix used for a fiber-reinforced resin shaped product, a thermoplastic resin and a thermosetting resin are generally known. In the present invention, the thermoplastic resin is used as a matrix constituting the fiber-reinforced resin shaped product A. Also, the thermosetting resin may be used as a matrix in combination so long as the thermoplastic resin is a main component.

The thermoplastic resin is not particularly limited, and a thermoplastic resin having a desired softening point or melting point may be suitably selected and used while considering excellent mechanical properties, productivity, and the like according to the use of the fiber-reinforced resin joined body of the present invention or the like.

As the thermoplastic resin described above, in general, a thermoplastic resin having a softening point in a range of 180° C. to 350° C. is used, but the thermoplastic resin is not limited thereto.

As the thermoplastic resin, for example, a polyolefin resin, a polystyrene resin, a thermoplastic polyamide resin, a polyester resin, a polyacetal resin (a polyoxy methylene resin), a polycarbonate resin, a (meth)acryl resin, a polyarylate resin, a polyphenylene ether resin, a polyimide resin, a polyether nitrile resin, a phenoxy resin, a polyphenylene sulfide resin, a polysulfone resin, a polyketone resin, a polyether ketone resin, a thermoplastic urethane resin, a fluorine-based resin, a thermoplastic polybenzimidazole resin, and the like are exemplified.

As the polyolefin resin described above, for example, a polyethylene resin, a polypropylene resin, a polybutadiene resin, a polymethyl pentene resin, a vinyl chloride resin, a vinylidene chloride resin, a vinyl acetate resin, a polyvinyl alcohol resin, and the like are exemplified.

As the polystyrene resin described above, for example, a polystyrene resin, an acrylonitrile-styrene resin (an AS resin), an acrylonitrile-butadiene-styrene resin (an ABS resin), and the like are exemplified.

As the polyamide resin described above, for example, a polyamide 6 resin (Nylon 6), a polyamide 11 resin (Nylon 11), a polyamide 12 resin (Nylon 12), a polyamide 46 resin (Nylon 46), a polyamide 66 resin (Nylon 66), a polyamide 610 resin (Nylon 610), and the like are exemplified.

As the polyester resin described above, for example, a polyethylene terephthalate resin, a polyethylene naphthalate resin, a polybutylene terephthalate resin, a polytrimethylene terephthalate resin, liquid crystal polyester, and the like are exemplified.

As the (meth)acryl resin described above, for example, polymethyl methacrylate is exemplified.

As the polyphenylene ether resin described above, for example, modified polyphenylene ether, and the like are exemplified.

As the thermoplastic polyimide resin described above, for example, thermoplastic polyimide, a polyamide imide resin, a polyether imide resin, and the like are exemplified.

As the polysulfone resin described above, for example, a modified polysulfone resin, a polyether sulfone resin, and the like are exemplified.

As the polyether ketone resin described above, for example, a polyether ketone resin, a polyether ether ketone resin, and a polyether ketone ketone resin are exemplified.

As the fluorine-based resin described above, for example, polytetrafluoroethylene, and the like are exemplified.

Only one type of the thermoplastic resin used in the present invention may be used, or two or more types thereof may be used. As an embodiment of using two or more types of the thermoplastic resin in combination, for example, an embodiment of using, in combination, thermoplastic resins of which softening points or melting points are different from each other, an embodiment of using, in combination, thermoplastic resins of which average molecular weights are different from each other, and the like are exemplified, but the embodiment is not limited thereto.

In addition, in the fiber-reinforced resin shaped products A and B in the present invention, additives such as various fibrous or non-fibrous fillers such as an organic fiber or an inorganic fiber, a flame retarder, an UV resistant agent, a stabilizer, a release agent, a pigment, a softening agent, a plasticizing agent, and a surfactant may be contained within a range not impairing the object of the present invention.

With respect to the adhesion strength of the reinforcing fibers with the thermoplastic resin, which is the matrix, strength in tensile shear test of strands is desirably 5 MPa or more. This strength may be improved by a method of varying a ratio (O/C) of surface oxygen concentration of carbon fibers, a method of enhancing the adhesion strength of the carbon fibers with the matrix by imparting a sizing agent to the carbon fibers, or the like, in addition to selection of the matrix resin.

(Manufacturing method of Fiber-Reinforced Resin Shaped Product)

A manufacturing method of the fiber-reinforced resin shaped products A and B is not particularly limited. For example, an injection molding, an extrusion molding and a press molding are exemplified. In the case of the injection molding and the press molding, a matrix containing reinforcing fibers is heated just before molding to be plasticized, and is introduced into a mold. As a heating method, in the case of the injection molding, an extruder or the like is used, and in the case of the press molding, a hot-air dryer, an infrared ray heater or the like is used.

When the thermoplastic resin used as the matrix has a high water-absorbing property, it is preferable the thermoplastic resin is dried before molding. A temperature of the heated thermoplastic resin when molding is preferably the melting temperature +15° C. or more and the decomposition temperature −30° C. or less. When the heating temperature is less than the range, molding is difficult to be made because the resin is not melt, and when the heating temperature more than the range, the decomposition of the resin proceeds in some cases.

In the case of the injection molding, a conventionally know method may be used. For example, a method where a long fiber pellet, which is a pellet obtained by adjusting a molten thermoplastic resin to be a desired viscosity so as to be impregnated into reinforcing fibers in continuous fiber form and then by cutting is carried out, is used and a predetermined shape is obtained by an injection molding machine.

As another method than the above, a method of arranging, in a mold, a substrate such as a unidirectional sheet (UD sheet) in which continuous strands are aligned in parallel, a woven fabric and discontinuous fibers, introducing a thermoplastic resin therein to perform melt-impregnation or introducing a heat-melt thermoplastic resin to perform impregnation, and then performing cooling or the like is exemplified. Also, a method of arranging a film of a thermoplastic resin or the like together with reinforcing fibers into a mold and performing heating and pressing is exemplified. Further, as previously described, a method of putting a substrate containing a thermoplastic resin into a mold whose temperature is set to a predetermined temperature and performing pressing is preferable. The heating temperature is preferably within a range of the melting temperature of the thermoplastic resin +15° C. or more and the decomposition temperature thereof −30° C. or less.

In order to manufacture the fiber-reinforced resin shaped product by press molding, for example, single layer of a woven fabric or a knitted fabric constituted by reinforcing fibers, a unidirectional sheet (UD sheet) in which strands of continuous fibers are aligned in parallel, a paper-making sheet constituted by discontinuous fibers, a sheet or mat (hereinafter, referred to as reinforcing fiber mat in some cases) constituted by continuous or discontinuous fibers, or a base material that a powder form, a fibrous form, a massive form, a film form, a sheet form, a unwoven fabric, or the like, of the thermoplastic resin is contained in the above woven fabric, knitted fabric, UD sheet, paper-making sheet, reinforcing fiber mat, or a stacked body of multiple layers thereof is heated and pressed. Subsequently, by melting the thermoplastic resin to impregnate the thermoplastic resin into gaps between reinforcing fibers, a fiber-reinforced resin shaped product including the thermoplastic resin as the matrix may be manufactured. In this case, the thermoplastic resin may be that supplied when manufacturing a reinforcing fiber mat. The fiber-reinforced resin shaped product may be manufactured by stacking a layer (film, unwoven fabric, sheet or the like) constituted by the thermoplastic resin on at least one surface of the reinforcing fiber mat after forming the reinforcing fiber mat and heating and pressing the stacked body to impregnate the thermoplastic resin into the reinforcing fiber mat. That is, the fiber-reinforced resin shaped product may be manufactured by, after molding two or more kinds of a substrate which are the same or different by press molding, stacking another substrate or layer same as or different from the two or more kinds of the substrate and press molding.

As previously described, as an embodiment where the thermoplastic resin is contained in the reinforcing fiber mat, for example, a powder form, a fibrous form or a massive form of the thermoplastic resin is contained in the reinforcing fiber mat or an embodiment where a thermoplastic resin layer containing the thermoplastic resin is mounted or layered on the reinforcing fiber mat may be exemplified. Here, the thermoplastic resin layer may be constituted by depositing a powder form, a fibrous form or a massive form of the thermoplastic resin and may be constituted by a sheet form or a film form of the thermoplastic resin.

The reinforcing fiber mat is reinforcing fibers in a sheet form or a mat form by depositing the reinforcing fibers, entangling the reinforcing fibers, or the like. As the reinforcing fiber mat, a two-dimensionally isotropic reinforcing fiber mat in which longitudinal directions of the reinforcing fibers are randomly dispersed in in-plane directions and a three-dimensionally isotropic reinforcing fiber mat in which longitudinal directions of the reinforcing fibers are randomly dispersed in each X, Y and Z direction by entangling the reinforcing fibers to be in cotton-like state, or the like.

The substrate may contain reinforcing fibers being in different arrangement states in one substrate.

As an embodiment where reinforcing fibers being in different arrangement states in one substrate, for example, (i) an embodiment where reinforcing fibers being in different arrangement states are arranged in in-plane directions of the substrate and (ii) an embodiment where reinforcing fibers being in different arrangement states are arranged in a thickness direction of the substrate may be exemplified.

When the substrate has a layered structure constituted by a plurality of layers, (iii) an embodiment where arrangement states of reinforcing fibers contained in respective layers are different may be exemplified. Further, a combination of the embodiments (i) to (iii) may be exemplified.

In the present invention, it is preferable that the fiber-reinforced resin shaped products A and B are manufactured by subjecting the at least one substrate to compression molding (press molding). Here, orientation state of the reinforcing fibers in the present invention may be unidirectional alignment or two-dimensionally random dispersion. Also, the orientation state may be disorder arrangement, which is an intermediate arrangement between the unidirectional alignment and the two-dimensionally random dispersion (i.e., dispersed state where the longitudinal directions of the reinforcing fibers are not completely unidirectional alignment and are not completely random). Depending on fiber length of the reinforcing fibers, the longitudinal direction of the reinforcing fibers may be dispersed so as to have an angle with respect to in-plane directions of the whole substrate, the fibers may be arranged to be entangled in cotton-like state, and the fibers may be dispersed like a bidirectional woven fabric such as a plain fabric and a twill fabric, a multi-axial woven fabric, a unwoven fabric, a mat, a knit, a braided rope, a paper obtained by paper-making reinforcing fibers, or the like.

Among them, a unidirectional arrangement substrate where the longitudinal directions of the reinforcing fibers are unidirectional arranged, or an isotropic substrate in an orientation state where the longitudinal directions are two-dimensionally randomly dispersed in in-plane directions, is suitable.

When molding the protrusion part of the fiber-reinforced resin shaped product A used in the present invention, from the viewpoint of moldability, it is preferable that in at least one surface of the substrate, particularly a surface including the protrusion part, the reinforcing fibers are two-dimensionally randomly arranged.

The orientation state of the reinforcing fibers in the substrate may be confirmed by, for example, carrying out a tensile test in an arbitrary direction of the substrate and a direction perpendicular thereto to measure tensile modulus, and calculating a ratio (Eδ) obtained by dividing the larger value by the smaller value of the measured tensile modulus. As the ratio of the tensile modulus is close to 1, it can be evaluated that the reinforcing fibers are two-dimensionally dispersed in isotropic. When the ratio obtained by dividing the larger value by the smaller value in the tensile modulus in two directions at right angles does not exceed 2, it is evaluated as isotropy. When the ratio does not exceed 1.3, it is evaluated as excellent isotropy. As the substrate of the present invention, in the case of using a substrate excellent in isotropy (isotropic substrate), the joined body of the present invention, being excellent in moldability, formability to mold, and mechanical properties and having satisfactory joining strength, may be obtained, and the isotropic substrate may be suitably used. The orientation state of the reinforcing fibers when using the isotropic substrate is maintained in the fiber-reinforced resin shaped product of the present invention.

The reinforcing fiber areal weight in the substrate is not particularly limited, and is generally 25 g/m$^2$ to 10000 g/m$^2$.

The thickness of the substrate used in the present invention is not particularly limited, and is preferably within a range of 0.01 mm to 100 mm, more preferably within a range of 0.01 mm to 10 mm, and more preferably within a range of 0.1 mm to 5 mm.

In the case where the substrate used in the present invention has a structure in which a plurality of layers is layered, the thickness does not indicate a thickness of each layer but a thickness of the whole substrate, which is the sum of the thickness of each layer.

The substrate used in the present invention may have a single layer structure constituted by a single layer or a layered structure constituted by a plurality of layers.

An embodiment where the substrate has the layered structure may be an embodiment where a plurality of layers having the same composition is layered or an embodiment where a plurality of layers having different compositions from each other is layered.

Further, the embodiment where the substrate has the layered structure may be an embodiment where layers having different arrangement state of the reinforcing fibers from each other are layered. Examples of this embodiment include an embodiment where a layer in which the reinforcing fibers are unidirectionally arranged and a layer in which the reinforcing fibers are two-dimensionally randomly arranged are layered.

In the case where three or more layers are layered, the substrate may have a sandwiched structure constituted by an arbitrary core layer and skin layers which are layered on the both front and rear surfaces of the core layer.

The fiber-reinforced resin shaped products A and B in the present invention are preferably manufactured by a method of using the isotropic substrate and performing press-molding. This method is excellent in productivity and may obtain the fiber-reinforced shaped product having excellent isotropy. A method of previously preparing, by press-molding the isotropic substrate due to heat-compression and then cooling or the like, precursors (A', B') of the fiber-reinforced resin shaped products A and B, which have good handleability, and then layering one or two or more precursor(s) while heating, or heating one or two or more precursor(s) after layering, followed by press-molding to manufacture the fiber-reinforced resin shaped products A and B having desired thickness, shape and appearance may be applicable.

Specifically, the isotropic substrate or the precursor is softened by heating a temperature of the softening point of a thermoplastic resin constituting them +30° C. or more and +100° C. or less, and then is arranged into a mold to be pressed. At this time, as the pressurizing condition, a pressure is 0.1 MPa to 20 MPa, preferably 0.2 MPa to 15 MPa, and more preferably 0.5 MPa to 10 MPa. In the case where the pressure is less than 0.1 MPa, the isotropic substrate or the precursor is not able to be sufficiently pressed, spring-back or the like occurs, and mechanical strength of the fiber-reinforced resin shaped product is deteriorated in some cases. In the case where the pressure exceeds 20 MPa, for example, when the isotropic substrate or the precursor is large, an extremely large press machine is needed, which is not preferable economically. As the heating condition during pressing, a temperature in a mold is preferably, depending on type of the thermoplastic resin, a temperature of 20° C. or more lower than the crystalline melting point when the thermoplastic resin is crystalline, or a temperature of 20° C. or more lower than the glass transition temperature when the thermoplastic resin is amorphous in order to form the fiber-reinforced resin shaped product by cooling and solidifying the molten thermoplastic resin. For example, in the case of nylon, the temperature is usually 120° C. to 180° C., preferably 125° C. to 170° C., and further preferably 130° C. to 160° C.

Specific one example of the manufacturing method of the fiber-reinforced resin shaped products A and B in the present invention will be described below.

1) Process of cutting reinforcing fibers
2) Process of opening the cut reinforcing fibers
3) Process of obtaining fiber-reinforced resin shaped product precursor by mixing the opened reinforcing fibers and thermoplastic resin to be matrix in fibrous form, particulate form or molten state to prepare the isotropic substrate, and then by performing heat-compression
4) Process of molding the precursor In the present invention, the fiber-reinforced resin shaped product may be manufactured by carrying out the above processes in order, but the manufacturing method is not limited thereto.

For example, carbon fibers are used as a reinforcing fiber, strands constituted by a plurality of carbon fibers are continuously slit in a fiber-length direction to be a plurality of narrow width strands with a width of 0.05 mm to 5 mm if necessary, the obtained strands are continuously cut to have an average fiber length of 3 mm to 100 mm, the cut carbon fiber bundles are opened by blowing gas and is deposited, in the opened state, on a breathable conveyer net or the like in a layered state to obtain a reinforcing fiber mat in which carbon fibers are randomly dispersed in in-plane directions.

The thermoplastic resin in particulate form or short fibrous form may be deposited on the breathable conveyer net together with the carbon fibers at the almost same time, and the molten thermoplastic resin may be supplied in a film form on the carbon fiber layer in the mat to be impregnated into the carbon fiber layer to manufacture an isotropic substrate containing the thermoplastic resin. In this method, by adjusting the opening condition, the carbon fibers may be opened so that the carbon fiber bundle (A) in which carbon fibers of the critical number of single yarn or more are collected, and carbon fiber bundle ($B_1$) constituted by carbon fibers of less than the critical number of single yarn and/or carbon fiber single yarn ($B_2$) are present. A ratio of the carbon fiber bundle (A) to the total amount of the carbon fibers in the isotropic substrate is 20 Vol % to 99 Vol %, preferably 30 Vol % to 99 Vol %, and particularly preferably 50 Vol % to 90 Vol %.

Meanwhile, in order for the average fiber number (N) in the carbon fiber bundle (A) to be within the previously described range, in the suitable manufacturing method of the isotropic substrate, a size of fiber bundle provided to the cutting process, for example, a width of bundle or a fiber number per width may be adjusted. Specifically, a method of widening a fiber bundle by opening or the like and then performing the cutting process, and a method of providing a slit process before the cutting process are exemplified. The fiber bundle may be slit and cut simultaneously.

By the method as described above, the isotropic substrate containing the carbon fibers and the thermoplastic resin in fibrous form, particulate form or molten state may be obtained. Subsequently, the isotropic substrate is press molded, and thereby the fiber-reinforced resin shaped products A and B excellent in productivity and in-plane isotropy may be manufactured. As previously described, the isotropic substrate may be heated to a temperature at which the thermoplastic resin is melt and be pressurized to form a planer carbon fiber resin shaped product precursor (A', B'), and then the press-molding may be re-carried out to manufacture a desired carbon fiber resin shaped product. The precursor (A', B') is obtained in a planer shape such as a sheet and a mat, but includes that with a certain degree of thickness.

Thus obtained fiber-reinforced resin shaped products A and B are in-plane isotropic molded product in which, in in-plane direction thereof, carbon fibers are not aligned in a specific direction, but are dispersely arranged in random directions. The fiber-reinforced resin joined body in which the fiber-reinforced resin shaped products A and B are joined maintains the in-plane isotropy of the carbon fibers possessed by the isotropic substrate. The isotropy of the fiber-reinforced resin joined body may be quantitatively evaluated by obtaining a ratio of tensile modulus in two directions at right angles.

(Protrusion Part of Fiber-Reinforced Resin Shaped Product A)

The fiber-reinforced resin shaped product A includes at least one protrusion part. The protrusion part is inserted by a through part of a member B described later, and a portion protruding from the through part is caulked to form a caulked part.

The protrusion part of the fiber-reinforced resin shaped product A has a buckling stress in a range of 80 MPa to 450 MPa. In the case where the buckling strength is less than 80 MPa, by occurring buckling when a portion (hereinafter referred to as a projection portion in some cases) of the protrusion part, the portion projecting from the through part, caulking is completed at a short time, an amount of an unmelted part (undeformed part) in the projection portion in the caulked part becomes large, and the joining strength becomes low. In the case where the buckling stress exceeds 450 MPa, deformation of the projection portion becomes small due to caulking, it becomes difficult to complete the caulking at a short time, and thus practical application also becomes difficult. The measurement method of the buckling stress in the present invention may adopt the compression test in accordance with JIS K 7187:2011. The buckling stress of the protrusion part is preferably within a range of 100 MPa to 400 MPa, and more preferably within a range of 110 MPa to 350 MPa.

In the case of using ultrasonic for caulking, when a material having a low buckling strength due to small amount of the reinforcing fibers is used for the fiber-reinforced resin shaped product, loss of ultrasonic vibration in the fiber-reinforced resin shaped product becomes large, and thereby a time up to start of caulking becomes long, and after starting the caulking, the caulking is completed at a short time due to the above described buckling. For this reason, in the same joining time, a lowered degree of joining strength is remarkable compared to the case of using the fiber-reinforced resin shaped product A.

The caulked part means a part deformed to have a shape of umbrella, the portion obtained by inserting the protrusion part of the fiber-reinforced resin shaped product A into the through part of the member B and heating and pressurizing a portion protruding above from the through part (portion of the fiber-reinforced resin shaped product, which protrudes above). This caulked part generally has a shape like umbrella and is represented by an umbrella portion in some cases.

A method of controlling the buckling stress of the protrusion part to be within the range of 80 MPa to 450 MPa is not particularly limited. For example, the control may be achieved by controlling a diameter, a height, or a shape of the protrusion part. The buckling stress basically tends to be enhanced as the diameter of the protrusion part is thick and the height of the protrusion part is low. When the height of the protrusion part is low, it becomes difficult to obtain a large volume of the caulked part, and therefore a selection of appropriate range is necessary depending on the design.

Also, as the protrusion part is thicker at a base side than a tip end side, the buckling stress tends to be enhanced. The shape of the protrusion part is not particularly limited. Specifically, a cylindrical shape, a conical shape, a prismatic shape, a pyramidal shape, a trapezoidal shape, or the like may be exemplified. Among them, the cylindrical shape, the conical shape, the pyramidal shape and the trapezoidal shape may be suitably used because elements depending on a draft angle of a mold when molding are decreased. As one example, in the case where the protrusion part is the cylindrical shape, it is preferable that a diameter is selected from a range of 4 mm to 12 mm and a height of the portion protruding from the member B is selected from a range of 6 mm to 15 mm. The protrusion part protrudes from the through member of the fiber-reinforced resin shaped product B and is caulked. Therefore, as one example of the height of the portion protruding from a through hole of the fiber-reinforced resin shaped product B, in the case where the protrusion part is the cylindrical shape, the height is preferably within a range of 0.8 to 1.2 times of the diameter of the cylindrical shape.

As another method on controlling the buckling stress of the protrusion part, a method of controlling tensile modulus of the fiber-reinforced resin shaped product A is exemplified. In general, as the tensile modulus of the fiber-reinforced resin shaped product becomes high, the buckling stress tends to be enhanced. The tensile modulus of the fiber-reinforced resin shaped product A is not particularly limited. For example, by controlling the tensile modulus to be within a range of 15 GPa to 35 GPa, a desired buckling stress may be achieved. The range of the tensile modulus of the fiber-reinforced resin shaped product A is more preferably 20 GPa to 35 GPa.

A method of controlling the tensile modulus is not particularly limited. For example, the desired tensile modulus may be achieved by controlling tensile modulus of the reinforcing fibers, a content of the reinforcing fiber, a (average) fiber length of the reinforcing fibers and a fiber diameter of the reinforcing fibers. As the tensile modulus of the reinforcing fibers is high, the tensile modulus of the fiber-reinforced resin shaped product A may be enhanced. Specifically, use of the carbon fibers as a reinforcing fiber is exemplified. As a content of the reinforcing fiber is high, the tensile modulus of the fiber-reinforced resin shaped product A may be enhanced. However, when the addition amount is too much, flowability of the fiber-reinforced resin shaped product A when molding and caulking is lowered, and therefore a selection of appropriate range is needed. As a fiber length of the reinforcing fibers is long and a fiber diameter of the reinforcing fibers is small, the tensile modulus of the fiber-reinforced resin shaped product A may be enhanced. However, when the fiber length is too long, flowability of the fiber-reinforced resin shaped product A when molding and caulking is lowered, and therefore a selection of appropriate range is needed.

In the present invention, it is preferable that a part or the whole of a plurality of the reinforcing fibers contained in the inside of the protrusion part is contained in a portion other than the protrusion part in the fiber-reinforced resin shaped product A. The state that a part or the whole of the reinforcing fibers are contained, as well, in the portion other than the protrusion part in the fiber-reinforced resin shaped product A means a state where the carbon fibers contained in the inside of the protrusion part are penetrated into the portion other than the protrusion part (i.e., the fiber-reinforced resin shaped product excluding the protrusion part). In other words, it is in a state where the reinforcing fibers cross (pass) the bottom surface (a part at which the base of the protrusion part is cut horizontally) of the protrusion part. That is, it is preferable that at least one of the reinforcing fibers is present in both the protrusion part of the fiber-reinforced resin shaped product A and the portion other than the protrusion part. A state where the reinforcing fibers contained in the fiber-reinforced resin shaped product A are penetrated into the protrusion part and further penetrated into the portion other than the protrusion part in the fiber-reinforced resin shaped product A is more preferable. This state is suitable for enhancing the buckling strength of the protrusion part because strength of the protrusion part at the base side is improved. Such a state may be confirmed by observing a cross section of the protrusion part with a photograph or the like.

A method of making a part or the whole of a plurality of the reinforcing fibers contained in the inside of the protrusion part being contained, as well, in the portion other than the protrusion part in the fiber-reinforced resin shaped product A is not particularly limited. As one example of the method, a method of controlling a fiber length of the reinforcing fibers is exemplified. By making the reinforcing fibers have a long fiber length to some extent, the reinforcing fibers may be contained in the portion other than the protrusion in the fiber-reinforced resin shaped product A. Conversely, by making the reinforcing fibers have a fiber length a short fiber length to some extent, the reinforcing fibers is easily penetrated into the protrusion part, depending on the diameter of the protrusion part. Specifically, it is preferable that the lower limit of the fiber length of the reinforcing fibers is 1 mm, and the upper limit thereof is 20 times as long as the diameter of the protrusion part.

As another method, it is preferable that control is made so as for the reinforcing fibers to easily flow into the protrusion part when forming the protrusion part. The method of controlling the flowability is not particularly limited. Specifically, a selection of the resin, a control of a fiber length or a fiber diameter of the reinforcing fibers, a control of the fiber bundles, a control of addition amount of reinforcing fibers, a control of the molding temperature or molding pressure, or the like, is exemplified. A method of enhancing the flowability generally includes lowering viscosity of the resin, shortening the fiber length, thickening the fiber diameter, thickening the fiber bundles, decreasing the addition amount, increasing molding temperature and increasing molding pressure. However, these methods may deteriorate the mechanical strength of the fiber-reinforced resin shaped product, and thus it is preferable to make an appropriate selection depending on the design.

A method of providing the protrusion part on the fiber-reinforced resin shaped product A is not particularly limited. For example, a method of using a mold for forming the fiber-reinforced resin shaped product A, the mold including a shape for forming the protrusion part and integrally molding the fiber-reinforced resin shaped product A and the protrusion part thereof, and a method of separately preparing the fiber-reinforced resin shaped product A and the protrusion part and heat welding the protrusion part with the fiber-reinforced resin shaped product A or joining them with an adhesive, are exemplified. As previously described, since when a part or the whole of a plurality of the reinforcing fibers contained in the inside of the protrusion part is contained, as well, in a portion other than the protrusion part in the fiber-reinforced resin shaped product A, strength of the protrusion part at the base side is improved and the buckling strength of the protrusion part may be enhanced, the method of integrally molding the fiber-reinforced resin shaped product A and the protrusion part is preferable.

(Through Hole of Member B)

The member B used in the present invention includes at least one through hole. A size and a shape of the through hole are required that the protrusion part of the fiber-reinforced resin shaped product A may be completely inserted and the protrusion part protrudes from the through hole to a degree in which caulking may be carried out. The shape of the through hole may be selected depending on the shape of the protrusion part, and it is preferable that the shape is designed so as to be larger than the shape of the fiber-reinforced resin shaped product.

A method of obtaining the through hole is not particularly limited. For example, a method of drilling with a drill, an endmill, a water jet, a laser or the like, a method of press-molding the substrate by using a mold in which a portion to be the through hole has been punched in advance, or the like, is exemplified.

(Fiber-Reinforced Resin Joined Body)

The shape of the fiber-reinforced resin joined body in the present invention is not particularly limited, and for example, may be constituted by the fiber-reinforced resin shaped product A in a sheet form or a rod form and the fiber-reinforced resin shaped product B having the same shape. The fiber-reinforced resin joined body may have a configuration that the fiber-reinforced resin shaped product A includes two or more protrusion parts, and the all protrusion parts are inserted into two or more through parts of the fiber-reinforced resin shaped product and are caulked. The fiber-reinforced resin joined body may have a configuration that one protrusion part of a fiber-reinforced resin shaped product A including one or more protrusion part is inserted into one through part of a fiber-reinforced resin shaped product B including one or more protrusion part and one or more through part and is caulked, and the one or more protrusion part of the fiber-reinforced resin shaped product B is inserted into a through part and is caulked.

A cross tensile strength of the fiber-reinforced resin joined body in the present invention is preferably 1.5 kN or more. In the case where the cross tensile strength is less than 1.5 kN, it is difficult to be considered sufficient strength for use of structural components or the like. More preferably, it is 2 kN or more. This cross tensile strength may be controlled in the same manner as the tensile modulus of the fiber-reinforced resin shaped product A. As a reinforcing fiber, carbon fibers are preferable, as previously described.

The caulked part in the fiber-reinforced resin joined body in the present invention is formed by caulking due to heating and compression. A method of heating will be described later. By heating and compression, the portion (projection portion) protruding from the through hole of the member B in the protrusion part in the fiber-reinforced resin shaped product A is melted to be caulked, and thereby a caulked part with an umbrella shape is formed. In other words, the caulked part of the present invention includes a portion in which the projection portion derived from the protrusion part in the fiber-reinforced resin shaped product A is melted and is deformed to be in an umbrella shape and an unmelted part (undeformed part). The unmelted part is a portion derived from the portion of the protrusion part, protruding from the through hole, i.e., an unmelted part of the projection portion.

Figure 1:
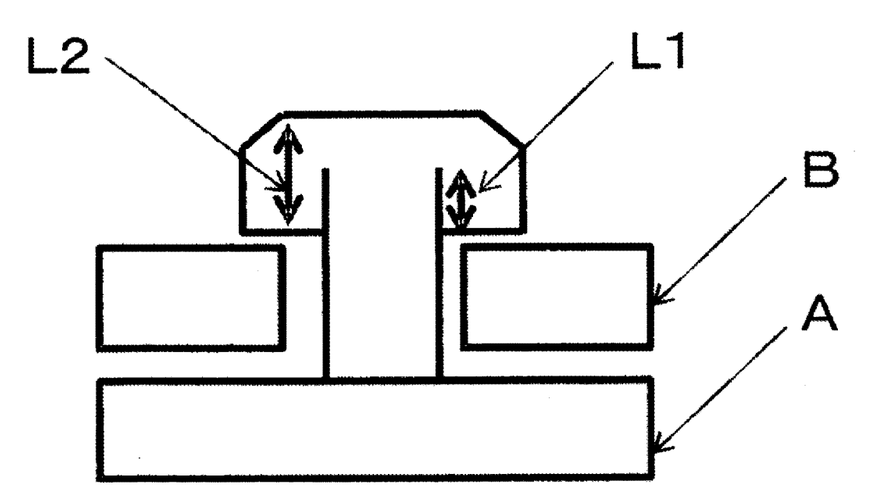
FIG. 1 is a schematic view showing a cross section of one example of the fiber-reinforced resin joined body of the present invention.

A ratio of the unmelted part of the inside of the caulked part, i.e., a relationship between a length (L1) of the undeformed part (unmelted part) derived from the projection portion in the inside of the caulked part and a height (L2) of the caulked part, preferably satisfies the following equation (see FIG. 1).

$$0<L1/L2<0.6$$

The relationship of L1 and L2 falls within the above range, excellent joining strength tends to be obtained, which is preferable. A method of controlling the length of the unmelted part is not particularly limited. Specifically, a method of controlling the buckling stress of the protrusion part to be within the previously described range or caulking conditions is exemplified. As the caulking conditions, a heating temperature of the protrusion part, a pressure applied to the protrusion part, a caulking time and the like are exemplified. As the caulking time is shortened by enhancing the pressure applied to the protrusion part or the like, the length of the unmelted part tends to be long. The above relationship in the caulked part preferably satisfies the following equation.

$$0<L1/L2<0.5$$

Meanwhile, L1 and L2 of the caulked part may be measured by using a vernier caliper after fracturing the caulked part.

As previously described, the protrusion part of the fiber-reinforced resin shaped product A has a satisfactory buckling stress, and therefore the caulked part in the fiber-reinforced resin joined body in the present invention has excellent mechanical properties. Accordingly, when a load applied to the caulked part and the caulked part is broken, the umbrella part breakage occurs in many cases. In the case of the umbrella part breakage, the broken state is a shear breakage to a direction parallel to the shaft, and the joining strength largely depends on an amount of the unmelted part in the caulked part.

The fiber-reinforced resin joined body of the present invention has excellent joining strength due to the above caulking. Depending on the application thereof, the caulked part may be reinforced by another joining method such as use of an adhesive.

The caulked part is preferably in contact with the surface of the member B, but may not be in contact with the surface so long as the joining strength is ensured. Also, the protrusion part may or may not be in contact with the inside surface of the through hole of the member B.

(Manufacturing Method of Fiber-Reinforced Resin Joined Body)

The fiber-reinforced resin joined body of the present invention is basically constituted by the fiber-reinforced resin shaped product A and the member B. The fiber-reinforced resin shaped product A contains the reinforcing fibers and the thermoplastic resin as the matrix and includes at least one protrusion part. The member B includes at least one through hole, and preferably contains the reinforcing fibers and the thermoplastic resin as the matrix. The protrusion part of the fiber-reinforced resin shaped product A is inserted into the through hole of the member B, and the portion protruding (projection portion) is caulked. When caulking, the projection portion is preferably pressurized while being heated, and is cooled and solidified after completion of the deformation to form the caulked part.

A method of heating the projection portion is not particularly limited. For example, a method of heating by being in contact with a heater such as a hot plate, a method of heating with an infrared ray, a method of heating with ultrasonic vibration, and the like are exemplified. Among them, the method of heating with an infrared ray may selectively heat a portion to be deformed in the projection portion and is suitable for controlling the length of the unmelted part of the projection portion. The method of heating with ultrasonic vibration may complete the caulking at a short time and be suitably used. At this time, in a case where position of the fiber-reinforced resin shaped product A and the member B is fixed to fix a welding position, a jig called anvil is used in many cases.

The umbrella shape of the caulked part after caulking may be specifically determined by a shape of a jig used in the caulking. A volume of the jig is determined while adjusting a volume of the projection portion to be used in the caulking. Specifically, a portion to be welded in the projection portion is preferably 1.1 to 1.2 times as large as volume of the jig used in the caulking.

The fiber-reinforced resin joined body may include one caulked part or two or more caulked parts.

EXAMPLES

Examples will be described below, but the present invention is not limited thereto.

1. Various Evaluations

Each value in this example was obtained according to the following method.

(1) The cross tensile strength of the fiber-reinforced resin joined body was measured according to No.M406-87 issued in March, 1987 by The Society of Automotive Engineers of Japan (JSAE). Specifically, the cross tension strength was obtained at the size of a test piece of 25 mm×75 mm×2.5 mm and a tensile rate of 5 mm/s.

(2) The buckling stress of the protrusion part was measured by a compression test according to JIS K 7181: 2011.

(3) The tensile modulus of the fiber-reinforced resin shaped product A was measured by a tensile test according to JIS K 7161: 1994.

(4) The length (L1) of an undeformed part of a protrusion part (remaining-melted part) at the inside of the caulked part and the height (L2) of the caulked part were measured by measuring a broken sample after the test described in (1) with a vernier caliper, and a ratio (L1/L2) of the remaining-melted part at the inside of the caulked part was calculated.

Manufacturing Example 1

Manufacturing of Fiber-Reinforced Resin Shaped Plate Including Isotropic Substrate As the carbon fiber, a carbon fiber "Tenax" (registered trademark) STS40-24KS (the average fiber diameter of 7 μm) manufactured by Toho Tenax Co., Ltd. which was cut to have the average fiber length of 20 mm was used, and as the matrix, a Nylon 6 resin A1030 manufactured by Unitika Limited was used so that a reinforcing fiber mat containing a Nylon 6 resin was prepared in which the carbon fibers were isotropically aligned, the reinforcing fiber mat having a carbon fiber areal weight of 1800 $g/m^2$ and a Nylon 6 resin areal weight of 1500 $g/m^2$, on the basis of a method disclosed in Pamphlet of International Publication No. WO2012/105080.

Specifically, a slitter was used as a separating device, which has disk-shaped blades made of cemented carbide, having a pitch of the blades of 0.5 mm. A rotary cutter was used as a cutting device, which had spiral blades made of cemented carbide at the surface thereof. At this time, a pitch of the blades was set to 20 mm so that the carbon fibers were cut to be a fiber length of 20 mm.

The strands passed through the cutter were introduced into a flexible transporting tube provided just under the rotary cutter, and continuously they were introduced into the opening device. As the opening device, nipples made of SUS 304, having different diameters, were welded to form a double tube to be used. Small holes were formed at the inside of the double tube, and compressed air was supplied into a gap between the inside tube and the outside tube by using a compressor. At this time, wind speed from the small holes is 10 m/sec. A taper tube which a diameter thereof was extended downward was welded at an under part of this tube.

From a side wall of the above tapered tube, a nylon 6 resin was supplied. Then, a breathable support (hereinafter referred to as fixing net) capable of moving in a fixed direction was provided on a lower part of an outlet of the tapered tube, and suction was performed from a lower side thereof by means of a blower, and a mixture of the cut carbon fibers and the nylon 6 resin was deposited in a belt form on the fixing net while the flexible transporting tube and the tapered tube were reciprocated in a width direction. The apparatus was operated with controlling the supplying amount of the reinforcing fiber to 500 g/min and the supplying amount of the nylon 6 resin to 530 g/min, and thereby obtaining a random mat, in which the reinforcing fiber and the thermoplastic resin were mixed, on the support. The mat was heated on a pressing apparatus heated at 260° C. using a mold having a concave portion at an upper part under 2.0 MPa for 5 minutes to obtain a shaped plate (I) having a thickness of 2.3 mm. The carbon fibers contained in the shaped plate (I) included both carbon fibers in single yarn form and carbon fiber in fiber bundle form in which a part thereof was opened. The carbon fibers were dispersed in isotropic in a flat plate direction of the shaped plate (I). The critical number of single yarn was 86 and the average fiber number was 420.

Manufacturing Example 2

Manufacturing of Fiber-Reinforced Resin Shaped Plate Including Isotropic Substrate A fiber-reinforced resin shaped plate was manufactured in the same manner as in the manufacturing example 1, except that a supply amount of the carbon fibers was 340 g/min, a supply amount of the nylon 6 resin was 530 g/min, a carbon fiber areal weight was 1200 $g/m^2$ and a nylon 6 resin areal weight was 1500 $g/m^2$.

Manufacturing Example 3

Manufacturing of Fiber-Reinforced Resin Shaped Plate Including Isotropic Substrate A fiber-reinforced resin shaped plate was manufactured in the same manner as in the manufacturing example 1, except that a supply amount of the carbon fibers was 170 g/min, a supply amount of the nylon 6 resin was 530 g/min, a carbon fiber areal weight was 600 $g/m^2$ and a nylon 6 resin areal weight was 1500 $g/m^2$.

Manufacturing Example 4

Manufacturing Example of Fiber-Reinforced Resin Shaped Plate Including Polycarbonate Resin A fiber-reinforced resin shaped plate was manufactured in the same manner as in the manufacturing example 1, except for using a polycarbonate resin (Panlite (registered trademark) manufactured by TEIJIN LIMITED, instead of the nylon 6 resin.

Reference Example 1

Manufacturing of Fiber-Reinforced Resin Shaped Product Including Isotropic Substrate A fiber-reinforced resin shaped plate was manufactured in the same manner as in the manufacturing example 1, except that a supply amount of the carbon fibers was 90 g/min, a supply amount of the nylon 6 resin was 530 g/min, a carbon fiber areal weight was 300 g/m² and a nylon 6 resin areal weight was 1500 g/m².

Reference Example 2

Manufacturing of Fiber-Reinforced Resin Shaped Product Including Isotropic Substrate A fiber-reinforced resin shaped plate was manufactured in the same manner as in the manufacturing example 1, except that a supply amount of the carbon fibers was 45 g/min, a supply amount of the nylon 6 resin was 530 g/min, a carbon fiber areal weight was 150 g/m² and a nylon 6 resin areal weight was 1500 g/m².

Reference Example 3

Manufacturing of Fiber-Reinforced Resin Shaped Product Including No Carbon Fibers A fiber-reinforced resin shaped plate was manufactured in the same manner as in the manufacturing example 1, except that a supply amount of the carbon fibers was 0 g/min, a supply amount of the nylon 6 resin was 530 g/min, a carbon fiber areal weight was 0 g/m² and a nylon 6 resin areal weight was 1500 g/m².

Example 1

The shaped plate (I) obtained by the manufacturing example 1 was cut out to be a size of 200 mm×100 mm, dried for 4 hours at 120° C. with a hot-air dryer, and then heated up to 280° C. with an infrared heater. A mold including 8 holes (concave portions) with a periphery of 200 mm×100 mm, a diameter of 6 mm and a depth of 10 mm was set to be 140° C., and the heated shaped plate (I) was introduced into the mold. Subsequently, pressing was performed for 1 minute under a pressing pressure of 5 MPa to obtain a shaped plate (I') including 8 protrusion parts with a diameter of 6 mm and a height of 10 mm. This obtained shaped plate was cut to be a size of 25 mm×75 mm so that each of the protrusion parts was at the center of each cut plate. The tensile modulus of the shaped plate (I') was 26 GPa. The buckling stress of the protrusion part was 120 MPa.

Similarly to the above, a mold for flat plate having a periphery of 200 mm×100 mm was used, and a shaped plate (I") with a size of 200 mm×100 mm was obtained. This was cut to be a size of 25 mm×75 mm, and a through hole with a diameter of 6 mm was processed at the center.

The protrusion parts of the shaped plate (I') were inserted into the through hole of the shaped plate (I"), and caulking was performed for 1 second under an amplitude of 60 μm and a pressing force of 1500 kN, by using an ultrasonic welding machine (2000XDt manufactured by BRANSON), so as to be a caulking diameter of 10 mm and a caulking height of 3 mm. Thus, a fiber-reinforced resin joined body was obtained. The cross tensile strength of the fiber-reinforced resin joined body was 2.5 kN. A ratio of the unmelted part in the projection portion at the inside of the caulked part to the height of the caulked part in the sample after the test was 0.45. It was confirmed, by observation of a cross section of the protrusion part with an optical microscope, that a part of the carbon fibers contained at the inside of the protrusion part was penetrated into the portion other than the protrusion part of the shaped plate (I').

Example 2

The fiber-reinforced resin joined body was obtained in the same manner as in the example 1, except for using the shaped plate obtained by the manufacturing example 2.

The tensile modulus of the shaped plate having a protrusion part was 22 GPa. The buckling stress of the protrusion part was 100 MPa. The cross tensile strength of the fiber-reinforced resin joined body was 2.1 kN. The ratio of the unmelted part in the projection portion at the inside of the caulked part to the height of the caulked part in the sample after the test was 0.35.

Example 3

The fiber-reinforced resin joined body was obtained in the same manner as in the example 1, except for using the shaped plate obtained by the manufacturing example 3.

The tensile modulus of the shaped plate having a protrusion part was 18 GPa. The buckling stress of the protrusion part was 85 MPa. The cross tensile strength of the fiber-reinforced resin joined body was 1.8 kN. The ratio of the unmelted part in the projection portion at the inside of the caulked part to the height of the caulked part in the sample after the test was 0.30.

Example 4

The fiber-reinforced resin joined body was obtained in the same manner as in the example 1, except that the protrusion parts had a diameter of 8 mm and a height of 8 mm, and the through hole had a diameter of 8 mm.

The tensile modulus of the shaped plate having a protrusion part was 26 GPa. The buckling stress of the protrusion part was 160 MPa. The cross tensile strength of the fiber-reinforced resin joined body was 3.0 kN. The ratio of the unmelted part in the projection portion at the inside of the caulked part to the height of the caulked part in the sample after the test was 0.4.

Example 5

The fiber-reinforced resin joined body was obtained in the same manner as in the example 1, except that the protrusion parts had a diameter of 10 mm and a height of 6 mm, and the through hole had a diameter of 10 mm.

The tensile modulus of the shaped plate having a protrusion part was 26 GPa. The buckling stress of the protrusion part was 200 MPa. The cross tensile strength of the fiber-reinforced resin joined body was 3.5 kN. The ratio of the unmelted part in the projection portion at the inside of the caulked part to the height of the caulked part in the sample after the test was 0.50.

Example 6

The fiber-reinforced resin joined body was obtained in the same manner as in the example 1, except that the protrusion parts were in a trapezoid shape having an upper side of 10 mm, a lower side of 22, a thickness of 5 mm and a height of 10 mm, and the through hole had a shape of 22 mm×5 mm.

The tensile modulus of the shaped plate having a protrusion part was 26 GPa. The buckling stress of the protrusion part was 250 MPa. The cross tensile strength of the fiber-reinforced resin joined body was 3.5 kN. The ratio of the unmelted part in the projection portion at the inside of the caulked part to the height of the caulked part in the sample after the test was 0.20.

Example 7

The fiber-reinforced resin joined body was obtained in the same manner as in the example 1, except that the pressing force was 2500 N.

The tensile modulus of the shaped plate having a protrusion part was 26 GPa. The buckling stress of the protrusion part was 120 MPa. The cross tensile strength of the fiber-reinforced resin joined body was 1.7 kN. The ratio of the unmelted part in the projection portion at the inside of the caulked part to the height of the caulked part in the sample after the test was 0.65.

Comparative Example 1

The fiber-reinforced resin joined body was obtained in the same manner as in the example 1, except for using the shaped plate obtained in the reference example 1.

The tensile modulus of the shaped plate having a protrusion part was 13 GPa. The buckling stress of the protrusion part was 70 MPa. The cross tensile strength of the fiber-reinforced resin joined body was 1.4 kN. The ratio of the unmelted part in the projection portion at the inside of the caulked part to the height of the caulked part in the sample after the test was 0.45.

Comparative Example 2

The fiber-reinforced resin joined body was obtained in the same manner as in the example 1, except for using the shaped plate obtained in the reference example 2.

The tensile modulus of the shaped plate having a protrusion part was 11 GPa. The buckling stress of the protrusion part was 50 MPa. The cross tensile strength of the fiber-reinforced resin joined body was 1.3 kN. The ratio of the unmelted part in the protrusion part at the inside of the caulked part to the height of the caulked part in the sample after the test was 0.40.

Comparative Example 3

The fiber-reinforced resin joined body was obtained in the same manner as in the example 1, except for using the shaped plate obtained in the reference example 3.

The tensile modulus of the shaped plate having a protrusion part was 8 GPa. The buckling stress of the protrusion part was 30 MPa. The cross tensile strength of the fiber-reinforced resin joined body was 1.0 kN. The ratio of the unmelted part in the projection portion at the inside of the caulked part to the height of the caulked part in the sample after the test was 0.40.

Comparative Example 4

The fiber-reinforced resin joined body was obtained in the same manner as in the example 1, except that the protrusion parts had a diameter of 4 mm and a height of 12 mm, and the through hole had a diameter of 4 mm.

The tensile modulus of the shaped plate having a protrusion part was 26 GPa. The buckling stress of the protrusion part was 60 MPa. The cross tensile strength of the fiber-reinforced resin joined body was 1.2 kN. The ratio of the unmelted part in the projection part at the inside of the caulked part to the height of the caulked part in the sample after the test was 0.70.

Example 8

The fiber-reinforced resin joined body was obtained in the same manner as in the example 1, except for using the shaped plate obtained in the manufacturing example 4.

The tensile modulus of the shaped plate having a protrusion part was 24 GPa. The buckling stress of the protrusion part was 110 MPa. The cross tensile strength of the fiber-reinforced resin joined body was 2.3 kN. The ratio of the unmelted part in the projection portion at the inside of the caulked part to the height of the caulked part in the sample after the test was 0.45.

INDUSTRIAL APPLICABILITY

The fiber-reinforced resin joined body of the present invention has excellent joining strength and is applicable for use requiring excellent welding strength such as vehicle structural members, and ensures weight reduction of a vehicle body.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2014-061711) filed on Mar. 25, 2014, the contents of which are incorporated herein by way of reference.

The invention claimed is:

1. A fiber-reinforced resin joined body, comprising:
    a fiber-reinforced resin shaped product A containing reinforcing fibers and a thermoplastic resin, and including at least one protrusion part with a bucking stress of 80 MPa to 450 MPa; and
    a member B including at least one through hole,
    wherein the protrusion part of the fiber-reinforced resin shaped product A is penetrated into the through hole of the member B,
    wherein a caulked part is provided in a portion of the protrusion part, protruding from the though hole,
    wherein a tensile modulus of the fiber-reinforced resin shaped product A is 15 GPa to 35 GPa,
    wherein the reinforcing fibers are two-dimensionally randomly arranged in a surface including the protrusion part on the fiber-reinforced resin shaped product A,
    wherein at least one reinforcing fiber in the reinforcing fibers is contained in the protrusion part and in a portion of the fiber-reinforced resin shaped product A other than the protrusion part and the caulked part,
    wherein an average fiber diameter of the reinforcing fibers is in a range of 3 to 8 μm, wherein the thermoplastic resin is a polyolefin resin, a polystyrene resin, a thermoplastic polyamide resin, a polyester resin, a polyacetal resin, a polycarbonate resin, a polyarylate resin, a polyphenylene ether resin, or a polyphenylene sulfide, and wherein the caulked part includes an undeformed part at inside, and a length L1 of the undeformed part and a height L2 of the caulked part satisfy the following formula:

$0<L1/L2<0.6$.

2. The fiber-reinforced resin joined body according to claim 1, wherein the member B is a member of at least one selected from the group consisting of a metal, a resin and a resin containing reinforcing fibers.

3. The fiber-reinforced resin joined body according to claim 2, wherein the resin containing reinforcing fibers in the member B is a thermoplastic resin.

4. The fiber-reinforced resin joined body according to claim 3, wherein the thermoplastic resin in the member B is the same type of resin as the thermoplastic resin in the fiber-reinforced resin shaped product A.

5. The fiber-reinforced resin joined body according to claim 1, wherein the caulked part is in contact with a surface of the member B.

6. The fiber-reinforced resin joined body according to claim 1, wherein the reinforcing fibers contained in the fiber-reinforced resin shaped product A are discontinuous fibers.

7. A manufacturing method for a fiber-reinforced resin joined body, comprising:

inserting a protrusion part of a fiber-reinforced resin shaped product A containing reinforcing fibers and a thermoplastic resin and including at least one protrusion part with a buckling stress of 80 MPa to 450 MPa into a through hole of a member B including at least one through hole to protrude a tip end part of the protrusion part from the though hole; and caulking the tip end part, wherein the reinforcing fibers are two-dimensionally randomly arranged in a surface including the protrusion part of the fiber-reinforced resin shaped product A, wherein at least one reinforcing fiber in the reinforcing fibers is contained in the protrusion part and in a portion of the fiber-reinforced resin shaped product A other than the protrusion part and the caulked part, wherein an average fiber diameter of the reinforcing fibers is in a range of 3 to 8 µm, wherein the thermoplastic resin is a polyolefin resin, a polystyrene resin, a thermoplastic polyamide resin, a polyester resin, a polyacetal resin, a polycarbonate resin, a polyarylate resin, a polyphenylene ether resin, or a polyphenylene sulfide, and wherein a length L1 of an undeformed part and a height L2 of a caulked part derived from the tip end of the protrusion part satisfy the following formula:

$0<L1/L2<0.6$.

8. The manufacturing method for a fiber-reinforced resin joined body according to claim 7, wherein the caulking includes pressing the tip end part while heating.

9. The manufacturing method for a fiber-reinforced resin joined body according to claim 8, wherein the heating is a heating by using infrared ray or ultrasonic.

10. The fiber-reinforced resin joined body according to claim 1, wherein the caulked part includes a portion in which the projection portion derived from the protrusion part in the fiber-reinforced resin shaped product A is melted and is deformed to be in an umbrella shape, and an unmelted part.

11. The manufacturing method for a fiber-reinforcing resin joined body according to claim 7, wherein the caulked part includes a portion in which the projection portion derived from the protrusion part in the fiber-reinforced resin shaped product A is melted and is deformed to be in an umbrella shape, and an unmelted part.

12. The fiber-reinforced resin joined body according to claim 1, wherein the fiber-reinforced resin shaped product A includes a flat plate at a bottom surface of the protrusion part.

13. The manufacturing method for a fiber-reinforcing resin jointed body according to claim 7, wherein the fiber-reinforced resin shaped product A includes a flat plate at a bottom surface of the protrusion part.

* * * * *